Nov. 15, 1966  K. E. WOOD  3,285,392
CROP ELEVATING MACHINE
Filed Dec. 3, 1964
FIG. I
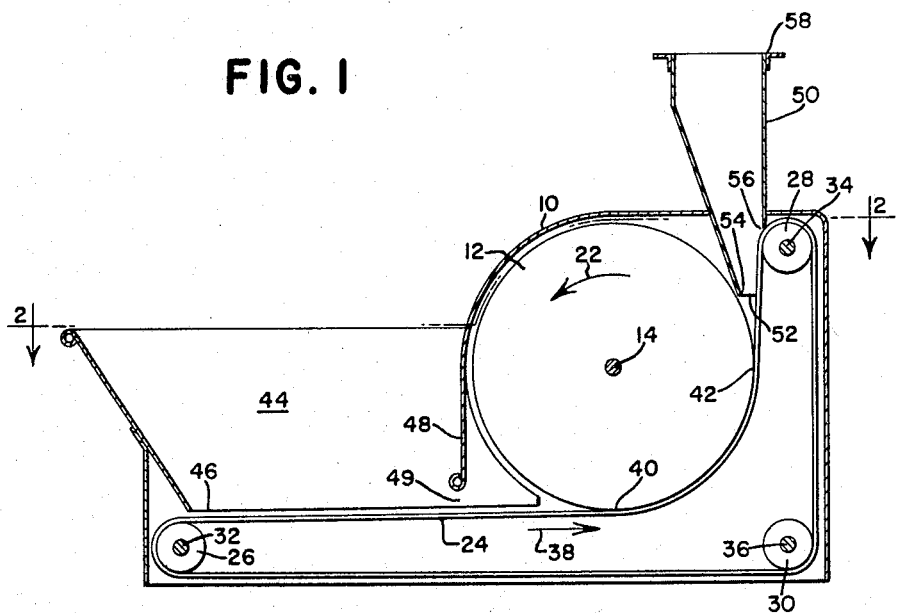
FIG. 2
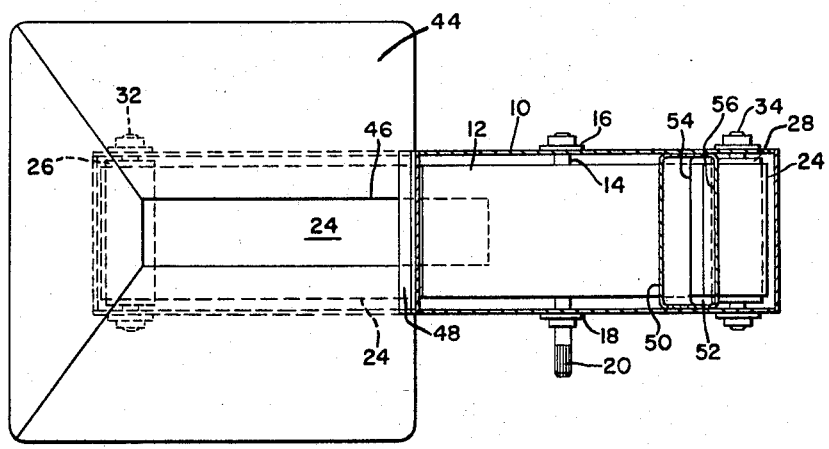
INVENTOR.
K. E. WOOD
BY John M Nolan
ATTORNEY

United States Patent Office 3,285,392
Patented Nov. 15, 1966

3,285,392
CROP ELEVATING MACHINE
Keith E. Wood, Ottumwa, Iowa, assignor to Deere & Company, Moline, Ill., a corporation of Delaware
Filed Dec. 3, 1964, Ser. No. 415,759
3 Claims. (Cl. 198—128)

This invention relates to a material handling device and more particularly to a machine for more efficiently elevating crop material such as chopped hay or ensilage into storage facilities.

Generally, machines known in the agricultural field as forage blowers are used to elevate such materials into a silo or hay mow, the blower conventionally comprising a rotor having radial vanes rapidly rotating within a closed housing, the vanes transmitting an angular velocity to the material as it enters the housing whereby the momentum of the material moves it tangentially upwardly through an outlet for delivery to the storage facility.

However, such blowers are inefficient users of power, a major cause of the power loss being the frictional drag between the moving material and the stationary housing.

The novel design of the present invention eliminates the friction between the material and the stationary housing while the material is being accelerated, the material being retained between components moving in the same direction at substantially the same speed while being impelled.

Accordingly, an object of the present invention is to provide a machine for more efficiently elevating crops and like materials.

Another object is to provide a crop elevating machine for imparting a velocity to the crop material whereby the crop material is elevated by its own momentum.

Another object is to provide such a machine wherein there is no frictional drag between the moving material and the stationary machine component, the material being retained between a rotating drum and a belt moving with the drum around the drum periphery while the material is being propelled.

Another object is to provide such a machine having a hopper for feeding crop material to the machine.

Another object is to provide such a machine that can easily be driven by a tractor power takeoff or other drive means.

Still another object is to provide such a machine of simple but rugged construction, relatively inexpensive to manufacture, operate, and maintain.

These and other objects will become apparent from a consideration of the following detailed description and accompanying drawings wherein an embodiment of the invention is described. In the drawings:

FIG. 1 is a central sectional elevation view of the crop elevating machine.

FIG. 2 is a sectional plan view taken along the line 2—2 of FIG. 1.

Referring now to the drawings, there is shown a crop elevating machine having a main supporting structure 10. A cylindrical drum 12 is mounted on a horizontal axial shaft 14 which is journaled for rotation in the supporting structure 10 at 16 and 18. One end of the shaft has connecting means 20 for connecting the shaft to drive means (not shown) such as a tractor power takeoff, whereby the drum is rotated in the direction of the arrow 22.

An endless belt 24 having substantially the same width as the drum, moves successively around horizontal rollers 26, 28, and 30 carried by horizontal shafts 32, 34, and 36 respectively which are journaled in the supporting structure 10, the belt moving in the direction of the arrow 38, tangentially and coextensively engaging the bottom of the drum 12 at 40, extending around approximately one-quarter of the periphery of the drum in the direction of drum rotation, and tangentially upwardly, separating from the drum at 42. The belt is under tension and preferably friction driven through contact with the drum, although it could be separately driven at the same velocity as the drum periphery, or a converse drive arrangement could be provided wherein the belt is driven and the drum is frictionally driven by the belt.

A hopper 44 is mounted on the supporting structure 10 and has an elongated outlet opening 46 along its bottom, the outlet opening being narrower than the width of the belt and centrally located over the horizontal portion of the belt between the roller 26 and the engaging area 40. The supporting structure 10 includes a depending member 48 which forms one wall of the hopper 44 adjacent to the drum, the bottom of the depending member 48 being spaced above the belt 24, forming a vertical opening 49 for movement of a layer of material from the hopper on the belt, the member 48 retaining all but the bottom layer of material in the hopper to prevent clogging of the machine.

A vertical discharge spout 50 has a rectangular inlet opening 52 extending the width of the belt between the drum 12 and the belt 24 proximately above the separation point 42. One edge 54 of the inlet opening 52 is closely adjacent to the surface of the drum for separating the material from the drum, and the opposite edge 56 is closely adjacent to the belt 24 for separating the material from the belt. The material moves through the discharge spout and out the spout oulet 58.

In operation, the crop material is placed in the hopper 44 from which it drops through the outlet 46 onto the belt 24. The moving belt carries a layer of the material through the opening 49 toward the drum 12, the material moving between the belt and the periphery of the drum when it reaches the drum. The material is partially accelerated by the moving belt 24 and reaches its discharge velocity while being retained between the belt 24 and the drum 12. When the belt tangentially separates from the drum at point 42, the material is released and is carried tangentially upwardly through the discharge spout 50 by its own momentum. Additional tubing may be added to the discharge spout outlet 58 to further conduct the moving material into the desired location.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A material handling device comprising a support, a drum journaled in the support and rotating about a horizontal axis, a plurality of horizontal rollers journaled in said support, an endless belt moving around the rollers, partially extending around the periphery of the drum, and separating from the drum at a point where the belt is moving in a generally upwardly direction, a hopper having an outlet above the drum-contacting surface of the belt for feeding the crop material thereto before the belt engages the drum, an upwardly extending discharge spout having an inlet opening between the belt and the drum proximately above the point where the belt separates from the drum, one edge of the inlet adjacently extending the width of the belt and the opposite edge being adjacent the periphery of the drum, the crop material passing between the drum and the belt and receiving an angular velocity whereby its momentum carries it tangentially upwardly through the discharge spout.

2. A crop elevating machine comprising a supporting structure, a drum journaled in the supporting structure for rotation about a horizontal axis, means for rotating the drum, a plurality of rollers journaled in said supporting structure for rotation about parallel horizontal axes, an endless belt moving around said rollers, partially extending around the periphery of the drum and tangentially upwardly separating from the drum in the direction of drum rotation, a hopper mounted on the supporting structure for feeding the crop material onto the drum-contacting surface of the belt proximately before the point of engagement with the drum, and an upwardly extending discharge spout mounted on the supporting structure and having an inlet opening between the belt and the drum proximately above the point where the belt separates from the drum, one edge of the inlet being adjacent the drum periphery and the opposite edge being adjacent the belt, the crop material passing between the drum and the belt and receiving an angularly velocity whereby its momentum carries it tangentially upwardly through the discharge spout.

3. A crop elevating machine comprising a supporting structure, a cylindrical drum having a smooth periphery and journaled in the supporting structure for rotation about a horizontal axis, means for rotating the drum, a plurality of rollers journaled in said supporting structure for rotation about parallel horizontal axes, an endless belt moving around said roller, the belt horizontally engaging the bottom of the drum, partially extending around the periphery of the drum in the direction of rotation, and tangentially upwardly separating from the drum, the width of the drum and belt being approximately coextensive, a hopper mounted on the supporting structure having an outlet adjacently above the drum-contacting surface of the belt proximately before the point of engagement with the drum for feeding material onto the belt, an upwardly extending discharge spout supported on the supporting structure and having a rectangular inlet opening between the belt and the drum adjacently above the point where the belt separates from the drum, one edge of the opening being closely adjacent to the periphery of the drum and approximately extending the width of the drum and the opposite edge closely adjacent the belt, the crop material passing between the drum and the belt and receiving an angular velocity whereby its momentum carries it tangentially through the discharge spout.

References Cited by the Examiner

UNITED STATES PATENTS

| 2,196,390 | 4/1940 | Gates | 198—128 |
| 2,868,351 | 1/1959 | Hegmann | 198—128 |

FOREIGN PATENTS 360,237  6/1938  Italy.

EVON C. BLUNK, *Primary Examiner.*

RICHARD E. AEGERTER, *Examiner.*